United States Patent
McKinley et al.

(10) Patent No.: US 8,085,440 B2
(45) Date of Patent: Dec. 27, 2011

(54) METHOD AND APPARATUS FOR SELECTING AN OPERATION TO BE PERFORMED ON AN IMAGE STORED IN A PRINTER

(75) Inventors: Patrick A. McKinley, Corvallis, OR (US); Jeffrey S. James, Escondido, CA (US); Gregory F. Carlson, Corvallis, OR (US); Steven Goss, Corvallis, OR (US); James D. Bledsoe, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 809 days.

(21) Appl. No.: 12/140,208

(22) Filed: Jun. 16, 2008

(65) Prior Publication Data

US 2008/0309993 A1 Dec. 18, 2008

Related U.S. Application Data

(60) Provisional application No. 60/944,263, filed on Jun. 15, 2007, provisional application No. 60/956,567, filed on Aug. 17, 2007.

(51) Int. Cl.
*H04N 1/40* (2006.01)
*H04N 1/46* (2006.01)
*G03F 3/10* (2006.01)

(52) U.S. Cl. ....... 358/3.24; 358/527; 358/537; 358/3.28

(58) Field of Classification Search .......... 358/3.24, 358/464, 448, 1.9, 527, 3.28, 1.16, 1.12, 358/1.2, 537; 178/19.01; 715/764
See application file for complete search history.

(56) References Cited

U.S. PATENT DOCUMENTS

| 6,081,261 | A | 6/2000 | Wolff et al. |
| 7,907,300 | B2 * | 3/2011 | Suzuki .................. 358/1.15 |
| 2005/0141060 | A1 | 6/2005 | Rydbeck et al. |
| 2007/0076263 | A1 * | 4/2007 | Matsuzaka et al. ......... 358/464 |
| 2008/0264701 | A1 * | 10/2008 | Radtke et al. ............ 178/19.01 |

FOREIGN PATENT DOCUMENTS

| JP | 09270022 | 10/1997 |
| JP | 2003500240 A | 1/2003 |
| JP | 09128137 | 5/2009 |
| WO | WO0071353 | 11/2000 |

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) specifications", ISO/IEC 8802-11, ANSI/IEEE Std 802.11, New York, N.Y., Aug. 20, 1999, pp. 1-531.

(Continued)

*Primary Examiner* — Charlotte M Baker (57) ABSTRACT

Methods and systems are provided to facilitate a printer to execute one or more operations in connection with one or more images are described herein. The methods may include methods that may, at least in part, be implemented at a printer including tracking one or more locations of a scan device with respect to a sheet having a first one or more pictures associated with one or more corresponding images, wherein the tracking is based, at least in part, on electronic data provided by the scan device. The printer may then based at least in part on the tracking, execute at least one operation in connection with all or a selected subset of the one or more corresponding images.

27 Claims, 9 Drawing Sheets

OTHER PUBLICATIONS

"IEEE Standard for Information technology—Telecommunications and information exchange between systems—Local and metropolitan area networks—Specific requirements. Part 15.1: Wireless Medium Access Control (MAC) and Physical Layer (PHY) Specifications for Wireless Personal Area Networks (WPANs)", IEEE Std 802.15.1—2002, New York, N.Y., Jun. 14, 2002, pp. 1-1169.

* cited by examiner

METHOD AND APPARATUS FOR SELECTING AN OPERATION TO BE PERFORMED ON AN IMAGE STORED IN A PRINTER

CROSS-REFERENCES TO RELATED APPLICATIONS

The present application claims priority to U.S. Provisional Patent Application No. 60/944,263 filed Jun. 15, 2007, entitled "METHOD AND APPARATUS FOR IMAGE SELECTION FROM A THUMBNAIL CONTACT PRINT SHEET FOR SUBSEQUENT VIEWING OR PRINTING OF FULL SIZE IMAGES," and U.S. Provisional Patent Application No. 60/956,567 filed Aug. 17, 2007, entitled "INTERACTIVE EDITING OF IMAGES USING A PRINTER," the entire disclosures of which are hereby incorporated by reference in their entirety for all purposes.

TECHNICAL FIELD

Embodiments of the present invention relate to the field of printers, and more particularly, to executing operations with respect to one or more images using a printer in conjunction with a scan device such as an electronic pen.

BACKGROUND

The popularity of electronic devices such as digital cameras and video recorders for taking photographic pictures or images has exploded in recent years. In order to obtain hard copies (i.e., photographs) of the digitized images stored using such devices, users of such devices will typically take such a device or a memory card from the device to a photo shop to download the digitized images stored in the device or its memory card. The user will then view the images at the photo shop and select which of the images stored in the device or its memory card to print. Alternatively, users of such devices can purchase relatively low cost photo printers and directly print their own pictures using such printers. To date, there have been two primary mechanisms to browse and select photos using these types of low cost photo printers.

The first mechanism is to utilize, for example, a color liquid crystal display (LCD) to browse and select images to be printed. The user can scroll through the images and mark or tag specific images for some later action, such as printing. This solution can be cumbersome for the user given the relatively small size of the display that typically comes with the printers. For many novice customers, this selection mechanism is also not intuitive.

The second mechanism is to print a thumbnail contact proof sheet of the images available. This printed proof sheet, which may also be referred to as an "index sheet," has "Scantron" equivalent circles that the user shades and then consequently scans using a scan head that may be included with the printer. During the scan process, the printer recognizes where the user filled in the circles to tag images for some later action, such as printing. Although this provides a more natural user interface that people are accustomed to, the rescanning of the entire page is an additional step that is not intuitive or simple. Further, a scan head is needed with the printer in order to perform the scanning operation, thus adding to the overall costs of the printer.

SUMMARY OF INVENTION

According to various embodiments of the present invention, methods, and systems are provided to facilitate a printer to execute one or more operations in connection with one or more images. The methods may include methods that may, at least in part, be implemented at a printer including tracking one or more locations of a scan device with respect to a sheet having a first one or more pictures associated with one or more corresponding images, wherein the tracking is based, at least in part, on electronic data provided by the scan device. And based at least in part on the tracking, executing at least one operation in connection with all or a selected subset of the one or more corresponding images.

In some embodiments, the executing may comprise of printing a second one or more pictures on one or more sheets. For these embodiments, the printing of the second one or more pictures on one or more sheets may include printing pictures of all or the selected subset of the one or more corresponding images. In some embodiments, the printing of the second one or more pictures on one or more sheets may include modifying all or the selected subset of the one or more corresponding images, and printing pictures of all or the selected subset of the one or more corresponding images that have been modified on one or more sheets.

In some embodiments the modifying all or the selected subset of the one or more corresponding images comprises removing red-eye from all or the selected subset of the one or more corresponding images. In some embodiments, the modifying all or the selected subset of the one or more corresponding images may comprise cropping a portion or portions of all or the selected subset of the one or more corresponding images. In some embodiments, the modifying all or the selected subset of the one or more corresponding images may comprise adjusting contrast or enhancement of portion(s) of all or the selected subset of the one or more corresponding images. In some embodiments, the modifying all or the selected subset of the one or more corresponding images comprises enlarging at least portion(s) of all or the selected subset of the one or more corresponding images, and the printing pictures of all or the selected subset of the one or more corresponding images that have been modified on one or more sheets comprises printing the at least portion(s) of all or the selected subset of the one or more corresponding images that were enlarged.

In some embodiments, the tracking of the one or more locations of the scan device may include tracking the one or more locations of a nib of the scan device with respect to one or more locations on the sheet. In some embodiments, said tracking includes tracking wirelessly the one or more locations of the scan device. In some embodiments, said scan device generates the electronic data based on scanning one or more selective portions of the sheet and reading embedded data in the one or more selective portions of the sheet, and said tracking comprises determining a particular location of the scan device with respect to the sheet by processing the generated electronic data. For these embodiments, said tracking comprises determining one or more identities of all or the selected subset of the one or more corresponding images by processing said electronic data.

In some embodiments, the methods may include printing the sheet with embedded data, wherein the embedded data is used to facilitate said tracking. For these embodiments, said printing comprises printing the sheet with a pattern of dots and data to indicate locations of the dots with respect to the sheet. In some embodiments said printing comprises printing the sheet with identities associated with the one or more corresponding images.

In some embodiments, said executing comprises at least one of emailing all or the selected subset of the one or more corresponding images and/or displaying all or the selected subset of the one or more corresponding images. In some embodiments, said tracking comprises tracking movement of the scan device with respect to the sheet by determining multiple locations of the scan device with respect to the sheet over an interval of time, and said executing is based, at least in part, on the relative movement of the scan device with respect to the sheet.

In some embodiments, the methods may include methods that may be implemented at a scan device that includes scanning by the scan device one or more selective portions of a sheet having first one or more pictures while not scanning other portions of the sheet, said scanning including reading embedded data in the one or more selective portions of the sheet; and said first one or more pictures being associated with one or more corresponding images. The scan device may then generate electronic data based on the embedded data, said electronic data indicating, at least in part, one or more relative positions of the scan device with respect to the sheet, and transmit the electronic data to a printer to facilitate the printer in executing at least one operation in connection with all or a selected subset of the corresponding images.

For these embodiments, said electronic data may be transmitted wirelessly to the printer. Further, for these embodiments, the sheet may include a pattern of dots and data to indicate locations of the dots with respect to the sheet, and said reading includes reading at least one dot and data that indicates the location of the at least one dot with respect to the sheet. In some embodiments, the sheet may include identities associated with the one or more corresponding images, and said reading includes reading at least one identity. In some embodiments, said scanning comprises scanning multiple selective portions of the sheet over an interval of time and reading embedded data in the multiple selective portions, and generating and transmitting to the printer electronic data indicating the one or more relative positions of the scan device relative to the sheet during the interval of time to facilitate the printer in determining relative movement of the scan device with respect to the sheet.

In some embodiments of the present invention, a system is provided which includes a system comprising a scan device and a printer. For these embodiments, the scan device may be configured to scan one or more selective portions of a sheet having first one or more pictures while not scanning other portions of the sheet, to read embedded data in the one or more selective portions of the sheet and to generate and transmit electronic data based on the embedded data, the first one or more pictures being associated with one or more corresponding images. The printer may be communicatively coupled to the scan device to receive the electronic data and to track one or more locations of the scan device with respect to the sheet based on the electronic data, and to execute at least one operation in connection with all or a selected subset of the one or more corresponding images based, at least in part, on the tracking of the location or locations of the scan device.

In some embodiments, the printer may be configured to perform the at least one operation by printing a second one or more pictures on one or more sheets based, at least in part, on the electronic data received from the scan device. In some embodiments, said printer is further configured to print the sheet with the first one or more pictures, and to print the embedded data onto the sheet. In some embodiments, said scan device includes an interface to wirelessly transmit the electronic data to the printer. In some embodiments, said printer includes another interface to wirelessly receive the electronic data from the scan device.

These and other aspects of various embodiments of the present invention will be described in greater detail in the following description.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which is depicted by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

According to various embodiments of the present invention, methods and systems are provided that provide low-cost solutions for executing selective operations connected to one or more images in a printer. Embodiments of the present invention may employ at least a scan device, such as an electronic digital pen (or simply "electronic pen"), a printer, such as a photo printer, that is communicatively coupled to the scan device, and one or more "mark-up" sheets with embedded data that may be read by the scan device in order for the printer to determine the location(s) of the scan device with respect to the mark-up sheets. A "mark-up" sheet, as used herein, may be an index sheet containing a plurality of printed pictures of images, a photograph containing a single printed picture, or any other media having one or more printed pictures. A "sheet" as used herein may refer to any type of printable media such as paper, although not limited thereto. For ease of illustration and explanation, the word "image" will be used herein in reference to an electronic or digitized image, while the word "picture" will be used in reference to a printed version or hardcopy of the image.

The scan device may be used by a user to mark a mark-up sheet to indicate which operations the user wishes the printer to perform. While the user marks the mark-up sheet, the scan device may scan only selective location(s) of the mark-up sheet reading only the embedded data located in those selective location(s) that fall within the field of view of the scan device. The scan device may then provide to the printer, based on the read embedded data, electronic data that may be processed by the printer to determine which actions or operations to execute without the need to scan the entire mark-up sheet as is required using, for example, the Scantron technique. Thus, the scan device may be used to virtually "mark-up" printed image(s).

The printer, which may be communicatively coupled to the scan device, may automatically execute various operations such as editing and/or printing selective images on to one or more sheets, based at least in part on the electronic data provided by the scan device. In particular, the printer may track the location(s) of the scan device with respect to the mark-up sheet in order to determine the appropriate operations to be performed. Based on this determination of the location(s) of the scan device with respect to the mark-up sheet, and more specifically, with respect to particularly points or locations on the mark-up sheet, the printer may determine the appropriate operation(s) to perform, and execute them. The operation(s) to be executed may be in connection with all or a subset of a plurality of images that may have been previously loaded onto the printer. As used herein, the word "subset" may mean one or some. Note that the term "operation" and "action" will be used interchangeably throughout the following and are, therefore, synonymous unless otherwise indicated. These and other aspects of various embodiments will be described in greater detail herein.

Figure 1:
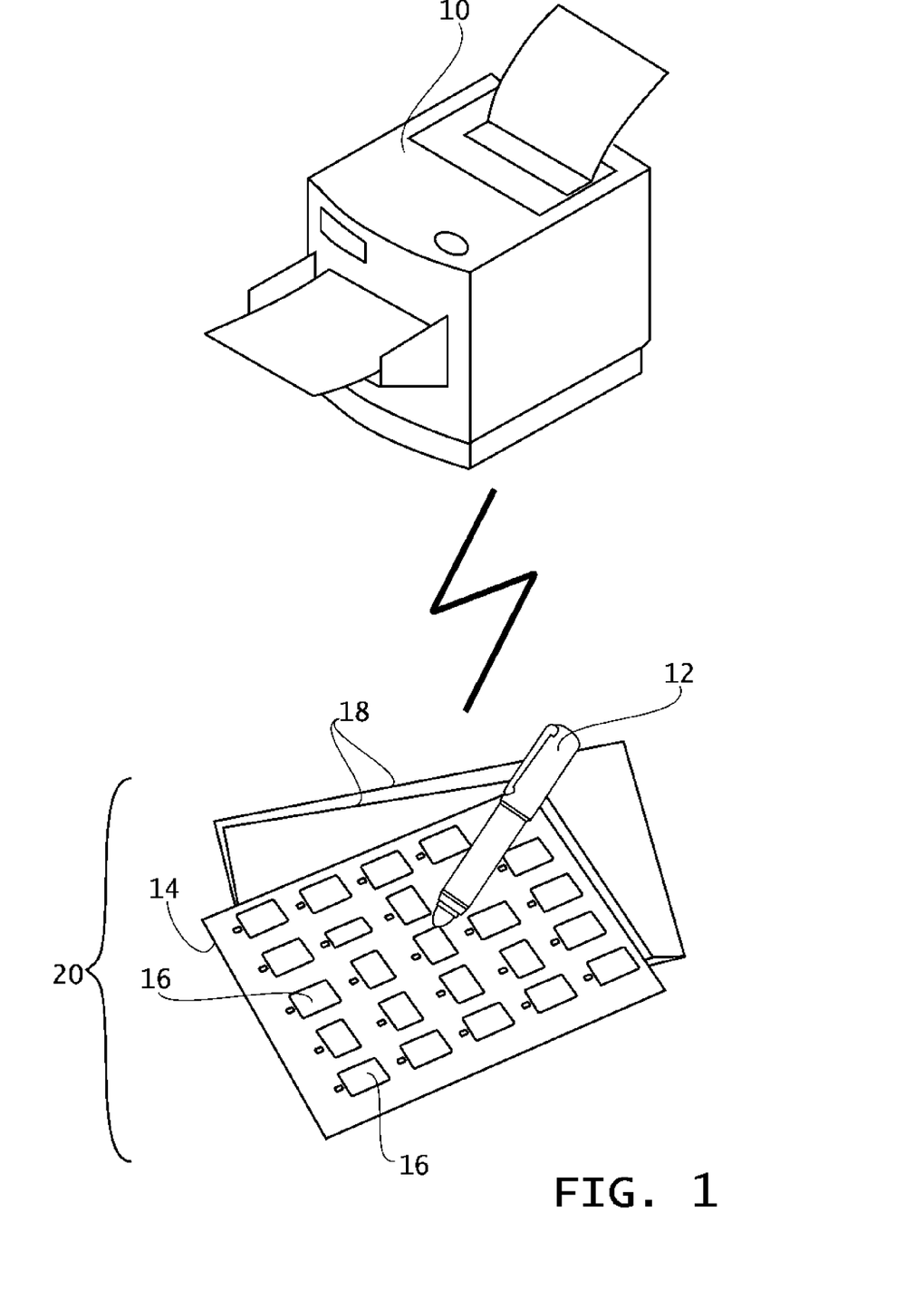
FIG. 1 illustrates a printer, a scan device, and mark-up sheets, in accordance with various embodiments of the present invention.
Figure 1A:
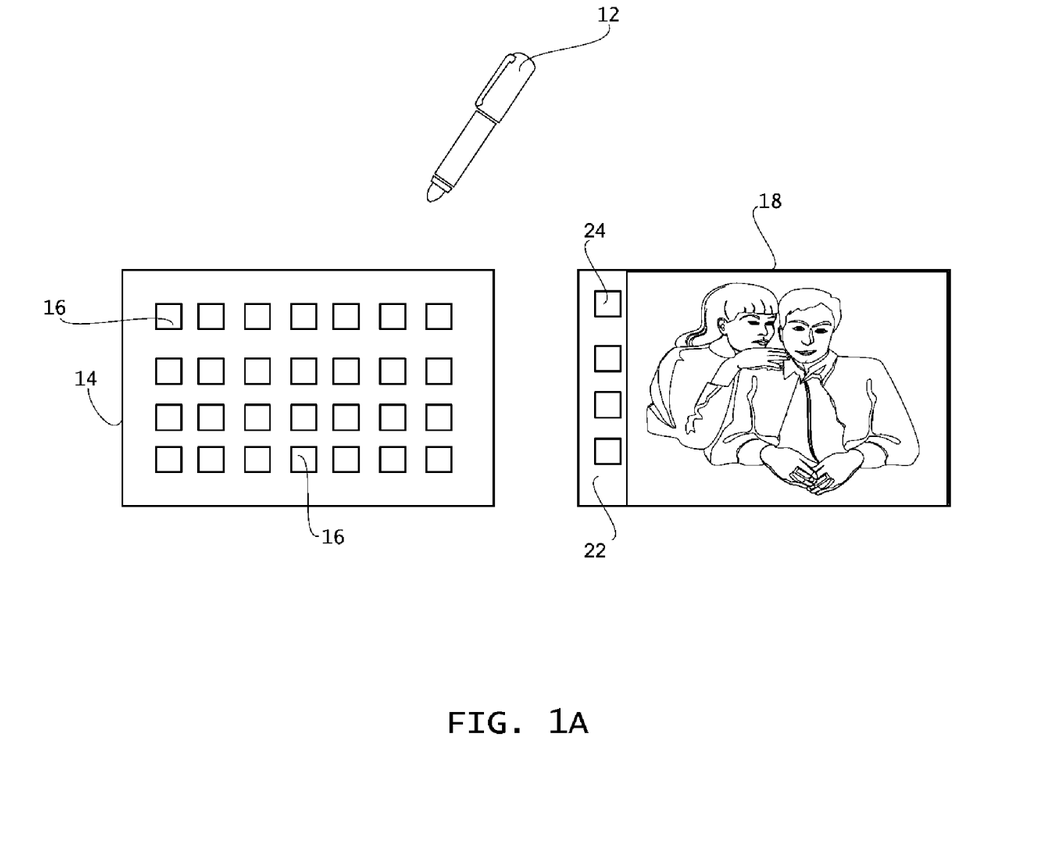
FIG. 1A illustrates a scan device, and mark-up sheets, in accordance with various embodiments of the present invention.

FIG. 1 illustrates a printer 10, a scan device 12 that is communicatively coupled to the printer 10, and a plurality of mark-up sheets 20, which in this case include an index sheet 14 and photographs 18, in accordance with various embodiments of the present invention. The index sheet 14 includes a plurality of "thumbnail" pictures 16, which are miniaturized pictures of images that may have been loaded and/or stored in the printer 10. In contrast, each of the photographs 18 is an individual picture of one of the images that have been downloaded and/or stored in the printer 10. FIG. 1A further illustrates index sheet 14 and photograph 18. In FIG. 1A photograph 18 includes action menu 22, which includes action selections 24 that a user may select with scan device 12 to select various actions to be performed on photograph 18. Thus, scan device 12 may be used as a pointer to both select menu actions and targeted areas of photograph 18.

In various embodiments, the printer 10 may load image files for a collection of digitized images from a variety of sources such as, for example, a digital camera, a memory card such as SD or CF photo card, CD-ROM or other storage media, a computing device such a laptop or desktop, or through the Internet. The collection of digitized images (or simply "images") may then be stored in, for example, a volatile memory, such as dynamic random access memory (DRAM) or static random access memory (SRAM). In some embodiments, the printer 10 may be configured to print mark-up sheets 20 (e.g., index sheet 14 and/or photographs 18), and to print embedded data onto the mark-up sheets 20 to facilitate the tracking of the location(s) of the scan device 12 with respect to the mark-up sheets 20 when the scan device 12 is being used by a user to mark the mark-up sheet 20. In some alternative embodiments, however, the printer 10 may be supplied with printable blank sheets that already include preprinted embedded data. In embodiments where the printer 10 prints the embedded data onto to a mark-up sheet 20, the data to be embedded may include data that may be embedded into a special ink layer printed underneath the visible ink layers. Thus, in some embodiments, such data may be invisible to the naked eye.

In some embodiments, the embedded data printed onto a mark-up sheet 20 may be encoded into a dot pattern that is printed onto the mark-up sheet 20 (i.e., index sheet 14 or photograph 18). The dots may be yellow or IR grid dots that may be printed onto the mark-up sheet 20 at regular intervals on the surface of the index sheet 20. The embedded data may also include data that indicates the locations of each of the grid dots. Such data may be in the form of microdots that are smaller than the grid dots. In some alternative embodiments or in the same embodiments, the embedded data may also include identifiers or identities that are associated with each of the corresponding images that are associated with the thumbnail pictures 16. The identities may be in the form of file names, file numbers, or other metadata. The general concept of embedding data in a printable media is known in the art and will, therefore, not be further described.

The scan device 12, in essence, may be used by a user to indicate to the printer 10, which action(s) should be performed on which image(s) that have been loaded onto the printer 10. In particular, the scan device 12 may be used by a user to write marks on the mark-up sheet 20 in order to edit or modify one or more images loaded on the printer 10 and/or for executing actions (i.e., printing, emailing, and so forth) in connection with all or a selected subset of the one or more images. In various embodiments, the scan device 12 may operate without any input from the printer 10, and therefore, operate independently from the printer 10. The scan device 12 may be used by a user to mark a mark-up sheet 20 to designate selective action(s) to be performed in connection with selective image(s) loaded on the printer 10.

The scan device 12 may include a stylus or an ink cartridge for use by a user to mark a mark-up sheet 20, as well as a scanhead to assist the printer 10 in tracking the location(s) of the scan device 12 with respect to the mark-up sheet 20 when the user is marking the mark-up sheet 20. As will be further described, the scan device 12 may include a scanhead that includes, for example, a camera, to scan selective portion(s) of a mark-up sheet 20 (i.e., index sheet 14 or photograph 18). In various embodiments, the scan device 12 may communicate with the printer 10 via a wired link (e.g., USB), or via a wireless link using one a variety of interface standards such as Institute of Electrical and Electronic Engineers (IEEE)

182.11 standard (i.e., WiFi), IEEE 182.15 standard (I.e., Bluetooth™), or other standards.

The following is an example of how the printer 10, the scan device 12, and a mark-up sheet 20 may be used together in accordance with some embodiments of the present invention. When a mark-up sheet 20 is being marked by a user using the scan device 12, the scan device 12 may read the embedded data included in the sections of the surface of the mark-up sheet 20 that will come within the field of vision of the scan device 12 as the mark-up sheet 20 is being marked by the user. As the scan device 12 is being used to mark the mark-up sheet 20, the scan device 12 may transmit to the printer 10 electronic data that may be generated as a result of reading the embedded data. Alternatively, the electronic data may be stored by the scan device 12, and transmitted to the printer 10 at some later time. The electronic data received by the printer 10 may be processed by the printer 10, and upon processing the data, the printer 10 may determine the location(s) as well as the relative movement of the scan device 12 with respect to the mark-up sheet 20 (and more particularly, with respect to specific points or locations on the mark-up sheet 20) as the user uses the scan device 12 to mark the mark-up sheet 20. Based on this determination, the printer 10 may execute the appropriate action(s) in connection with the appropriate image(s).

Figure 2:
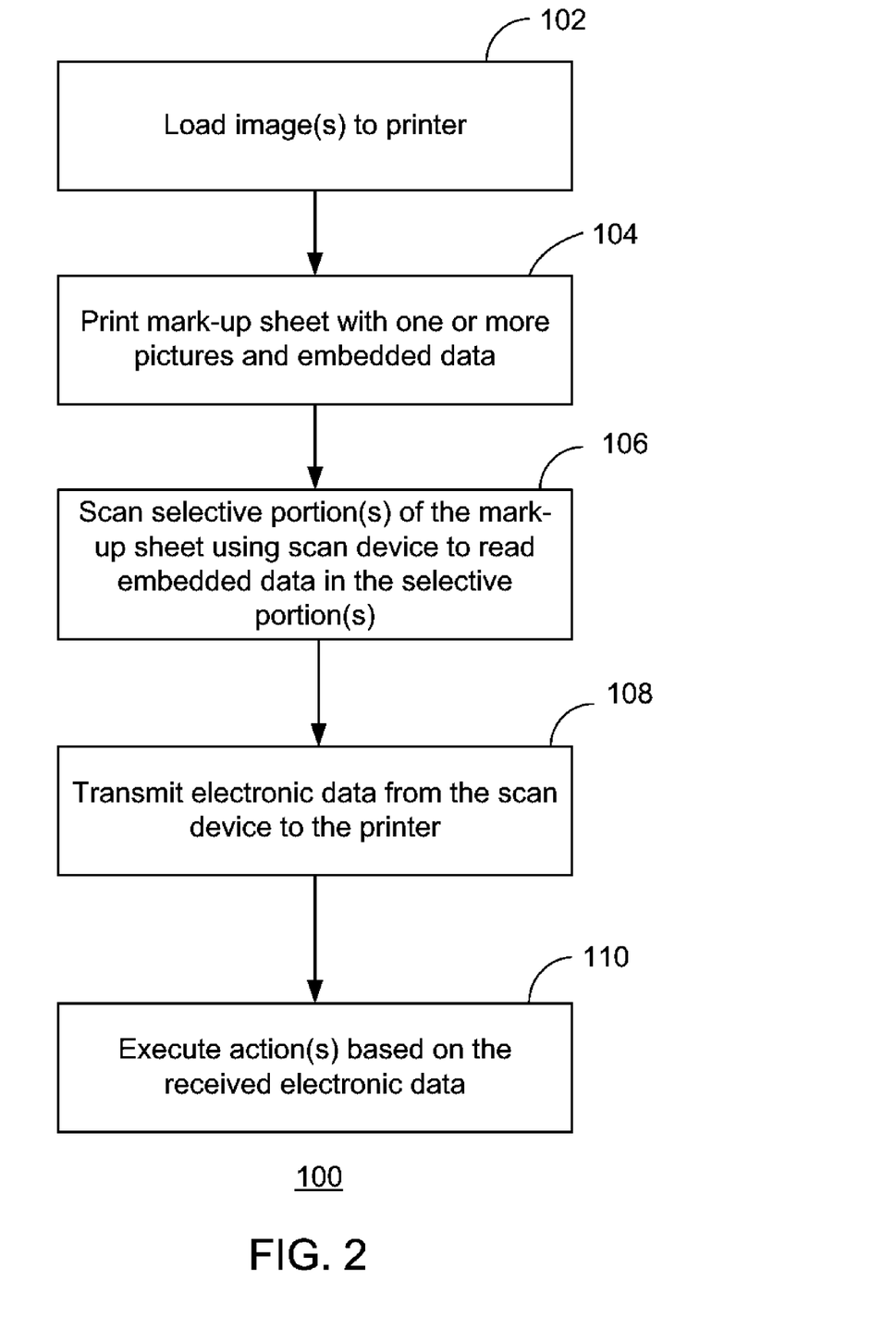
FIG. 2 is a flow process, in accordance with various embodiments of the present invention.

FIG. 2 is a flow process for executing one or more actions on one or more images in a printer in accordance with various embodiments of the present invention. The process 100 may begin when the printer 10 is loaded with image(s) at block 102. After image(s) are loaded, the printer 10 may print a mark-up sheet 20, which may be an index sheet 14 and/or a photograph 18 that includes one or more pictures associated with one or more corresponding images at block 104. In some embodiments, the one or more corresponding images may have been loaded to the printer 10. The mark-up sheet 20 may be embedded with data that may be printed onto the mark-up sheet 20 by the printer 10. Alternatively, the embedded data may have been preprinted on the mark-up sheet 20. The embedded data may include data that provides location information with respect to specific locations on the mark-up sheet 20, identifiers associated with the corresponding one or more images, page number of the mark-up sheet 20, and/or other information.

Selective portion(s) of the mark-up sheet 20 may then be scanned with a scan device 12 when a user uses the scan device 12 to mark the mark-up sheet 20. As the scan device 12 scans the selective portion(s), the scan device 12 may read the embedded data in the selective portion(s) of the mark-up sheet 20 at block 106. The embedded data in the selective portion(s) may indicate the location(s) of the scan device 12 with respect to the mark-up sheet 20. In particular, the embedded data read by the scan device 12 may indicate the location(s) of the scan device 12 with respect to specific locations or points on the mark-up sheet 20. The scan device 12 may then transmit electronic data generated as a result of the scan of the selective portion(s) of the mark-up sheet 20 to the printer 10 at block 108. The printer 10 may then process the received electronic data to determine the location(s) of the scan device 12 with respect to the mark-up sheet 20. Such a determination may indicate to the printer 10, which action(s) are to be performed on which image(s) loaded on the printer 10 at block 110. As will be further described, the action(s) to be executed may include, for example, editing or modifying of selective images, sizing of images for proof printing and final printing, printing of selective modified or unmodified images on one or more sheets, emailing of selective modified or unmodified images, and so forth.

Figure 3A:
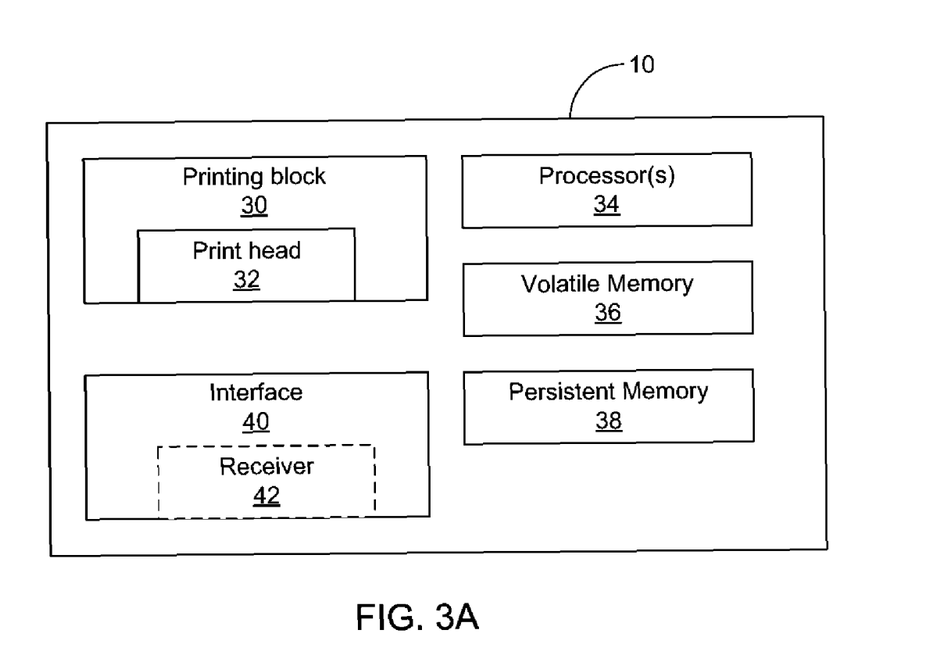
FIG. 3A is a block diagram that schematically illustrates various components of the printer of FIG. 1, in accordance with various embodiments of the present invention.

FIG. 3A is a block diagram that schematically illustrates various components of printer 10 of FIG. 1, in accordance with various embodiments of the present invention. The printer 10 may include a printing block 30 that may include a print head 32 and other mechanics for printing pictures onto a print media, one or more processors 34, volatile memory 36, persistent memory 38, and a communication interface 40 for communicating with a scan device 12. The interface 40, in some embodiments, may or may not include a radio receiver 42 for receiving electronic data from the scan device 12. Alternatively, the receiver 42 may be replaced by a transceiver in other alternative embodiments. Further, when the communication link between the printer 10 and the scan device 12 is a wired link, the interface may include a Universal Serial Bus (USB) port for receiving electronic data from the scan device 12. Although not depicted, the printer 10 may include other interfaces to facilitate downloading of image files from a variety of sources as previously described.

Persistent memory 38 may include computer readable instructions for executing the various operations that are described herein. Such instructions may be executed by the processor(s) 34. Volatile memory 36 may be employed to store images or image files that have been loaded to the printer 10. Volatile memory 36 may be any type of volatile memory such as SRAM, DRAM, or other types of volatile memory.

Figure 3B:
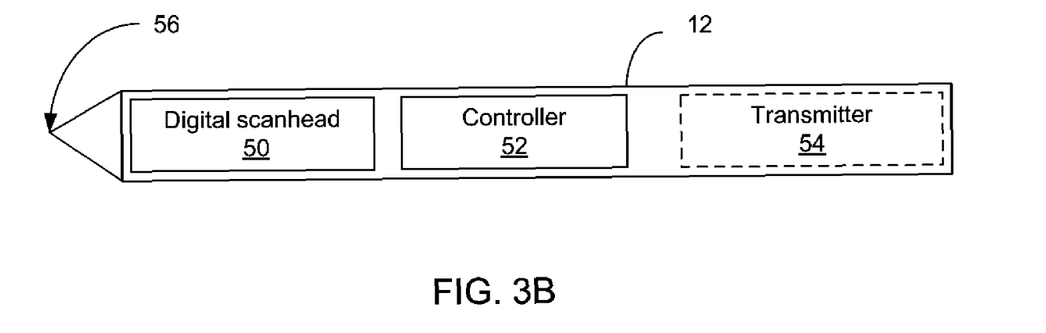
FIG. 3B is a block diagram that schematically illustrates various components of the scan device of FIG. 1, in accordance with various embodiments of the present invention.

Referring now to FIG. 3B, which is a block diagram that schematically illustrates various components of the scan device 12 of FIG. 1, in accordance with various embodiments of the present invention. The scan device 12 may include a digital scanhead ("scanhead") 50, which may include a camera. In various embodiments, the scanhead 50 may be designed to read embedded data that may be included in a mark-up sheet 20. The scan device 12 may further include a controller 52, such as a processor or microcontroller, a radio transmitter 54, which in some instances may be a transceiver, and a nib 56. In embodiments where the scan device 12 communicates with the printer 10 via a wired link, the radio transmitter 54 may not be present. The nib 56 may be the nib of a stylus or an ink cartridge that may be included with the scan device 12 for marking the index sheet 14 or photograph 18. By using the scan device 12 to mark a mark-up sheet 20 (i.e., index sheet 14 or photograph 18), various selective actions may be executed with respect to selective images that have been loaded to the printer 10. As previously described, in some embodiments, the scan device 12 may be a digital electronic pen.

In various embodiments, the scan device 12 when used to mark an index sheet 14, may be used to mark or tag selective pictures 16 (and the corresponding images associated with the tagged pictures 16) in the index sheet 14, and to select the type of action to be executed by the printer 10 in connection with the corresponding images associated with the tagged pictures 16. In some embodiments, the scan device 12 may be used to modify an image associated with one of the pictures 16 of the index sheet 14 or an image associated with a photograph 18 by merely marking the index sheet 14 or photograph 18 with specific figures such as arrows, circles, lines, letters, and so forth, or a combination thereof, at specific locations on the index sheet 14 or photograph 18. In order to accomplish these functions, the scanhead 50 may be configured to track the location of the nib 56 of the scan device 12 with respect to the index sheet 14 or a photograph 18. In some embodiments, the scanhead 50 may have a very limited field of vision and its field of vision may not include the nib 56 of the scan device 56 However, this is not a problem in determining the location of the nib 56 with respect to the index sheet 14 or a photograph 18 so long as the distance between the field of vision of the scanhead 50 and the nib 56 is known.

As the scan device 12 is being used to mark selective locations of the index sheet 14 or photograph 18, the scanhead 50 may read the embedded data located within the portion(s) of the index sheet 14 or photograph 18 that fall within the scanhead's field of vision. The controller 52 may then generate electronic data based on the embedded data read from the portion(s) of the index sheet 14 or photograph 18 being scanned by the scanhead 50. The electronic data generated may then be provided to the printer 10.

Figure 3C:
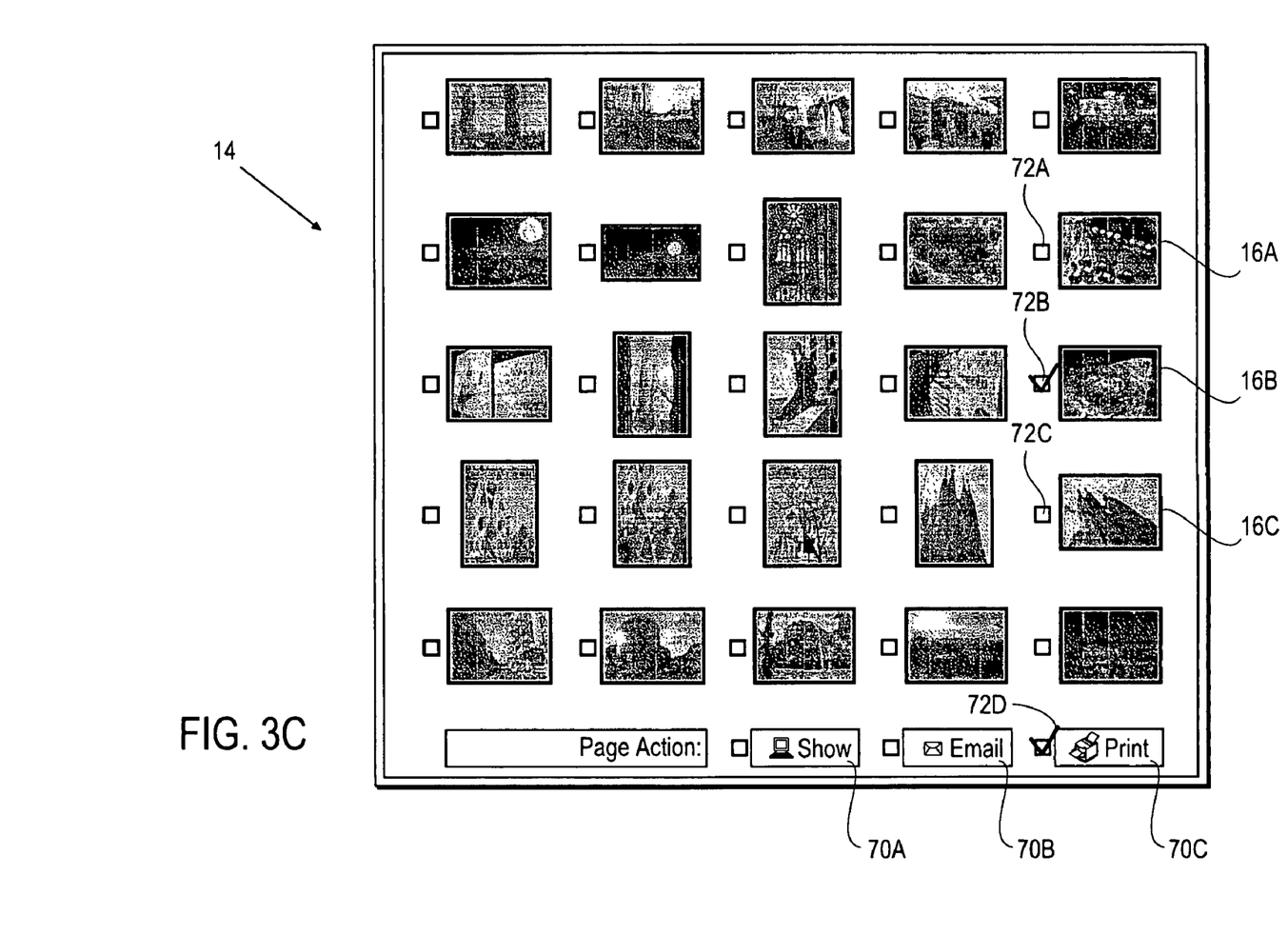
FIG. 3C illustrates the index sheet of FIG. 1, in further detail, in accordance with various embodiments of the present invention.

FIG. 3C illustrates the index sheet 14 of FIG. 1 in further detail, in accordance with various embodiments of the present invention. As depicted, the index sheet 14 includes a plurality of thumbnail pictures or simply "pictures" (three of the pictures being designated as ref. 16A, 16B, and 16C), action buttons 70A, 70B, and 70C, and check boxes (four of the check boxes being designated as 72A, 72B, 72C, and 72D) that are each adjacent to a corresponding picture or a corresponding action button. Each of the pictures (e.g., 16A, 16B, and 16C) may represent a corresponding image that may have been loaded onto the printer 10. The check boxes may be used in order to tag selective pictures as well as to tag the corresponding images associated with the tagged pictures. Although not depicted, the index sheet 14 may be embedded with data that may be read by the scan device 12 to facilitate the printer 10 in tracking the location(s) of the scan device 12 as a user marks the index sheet 14.

The action buttons 70A, 70B, and 70C represent an action or operation that may be performed by the printer 10. As depicted, action button 70A is a "show" button for displaying selected images for displaying on, for example, a liquid crystal display (LCD) screen that may be included with the printer 10, action button 70B is an "Email" button for transmitting selected (i.e., tagged) images via email, and action button 70C is for printing selected images. The check boxes 72A, 72B, and 72C are each located at specific locations on the index sheet 14.

To illustrate how the printer 10 may be used with the scan device 12 and the index sheet 14 in accordance with various embodiments, the following example is provided. Suppose a user wishes to print the image that is associated with picture 16B. In order to do so, the user may first place the nib 56 of the scan device 12 on the surface of the index sheet 14 at check box 72B. The placement of the nib 56 at the check box 72B may cause the scan device 12 to begin scanning at least a portion of the surface of the index sheet 14 in the vicinity of or at the location of the check box 72B as well as in view of the field of vision of the scan device 12 to read the embedded data at that location. The scan device 12 may then transmit electronic data to the printer 10 in response to reading the embedded data. In some embodiments, in order to prevent the scan device 12 from providing false or premature data to the printer 10, the scan device 12 may be endowed with certain features that would prompt the scan device 12 to only scan and/or transmit electronic data to the printer 12 only when the nib 56 is, for example, on the surface of the index sheet 14, in the vicinity of the surface of the index sheet 14, and/or at the prompting of the user. For example, a sensor such as a contact switch may be coupled to the nib 56 to detect when the nib 56 is in contact with the index sheet 14. Other mechanisms may also be employed for serving similar such purposes.

In some embodiments, the field of vision of the scanhead 50 may be very limited and may not include the nib 56 or the area immediately below the nib 56. The scanhead 50 may not need the nib 56 to be included in its field of vision so long as, for example, the distance between the nib 56 and the field of vision is known. As the user marks the check box 72B, to tag the image associated with picture 16B (check box 72B is depicted with a checkmark made by the user), the scan device 12 may scan the portion(s) of the index sheet 14 that falls within its field of vision, and read the embedded data disposed at those locations.

In response to reading the embedded data, the scan device 12 may generate electronic data, which may then be transmitted to the printer 10 via wired or wireless connection. The printer 10 may then process the received electronic data to determine the location(s) of the scan device 12 with respect to the index sheet 14. More particularly, the printer 10 may determine the location(s) of the nib 56 or the vicinity of the nib 56 with respect to specific points on the index sheet 14. In doing so, the printer 10 may determine which of the pictures 16A, 16B, and 16C (as well as their corresponding images) has been tagged. Note that the electronic data received by the printer 10 may indicate multiple locations for the nib 56 since the scan device 12 may be moving during the course of a time interval or segment. By determining the location(s) of the scan device 12 with respect to the index sheet 14 or with respect to selective points on the index sheet 14, the printer 10 can determine which one(s) of the images associated with the pictures (e.g., 16A, 16B, and/or 16C) has been tagged.

The user may also select the action(s) to be executed with respect to the selected images (in this case the image associated with picture 16B has been selected) by marking one or more of the check boxes of action buttons 70A, 70B, and 70C. This may be accomplished using the same procedures described above for tagging the pictures and their corresponding images. In this example, since the user intends to print the image associated with picture 16B, the user would mark check box 70C using the scan device 12. As the check box 70D is being marked, the printer 10 may track the location(s) of the scan device 12 with respect to the index sheet 14 as described earlier. Based on this determination, the printer 10 may determine the appropriate course of action with respect to the tagged image, and accordingly, execute the appropriate operation. In this case, the selected image would be printed onto a sheet. At this time it should be noted that in some alternative embodiments, check boxes may not be included in the index sheet 14 in which case, the user would simply place a mark such as an "X" on, for example, the pictures 16 or actions buttons 70A, 70B, and 70C.

Various embodiments of the present invention may also provide for the editing or modifications of the images that are loaded on the printer 10 using procedures similar to those described above. In particular, the scan device 12 may be used in conjunction with a mark-up sheet 20 (i.e., index sheet 14 or photograph 18) to edit an image(s). Editing of an image may include, for example, removal of red-eye from an image, deleting an image, rotating an image, "zooming" in on at least a portion of an image (i.e., enlarging at least a portion of an image), cropping portion(s) of an image, adjusting contrast or enhancement of an image or a portion thereof, and so forth. In some instances, some of the editing or modifications of an image may be realized only when the image is actually printed onto a printable media. Thus, editing of image(s) may be subsequently followed by a printing of the image(s) onto one or more sheets. In the following, examples of how images may be edited or modified using photographs are described although in some alternative embodiments or the same embodiments, the images may also be modified using the pictures 16 of an index sheet 14.

Figure 4A:
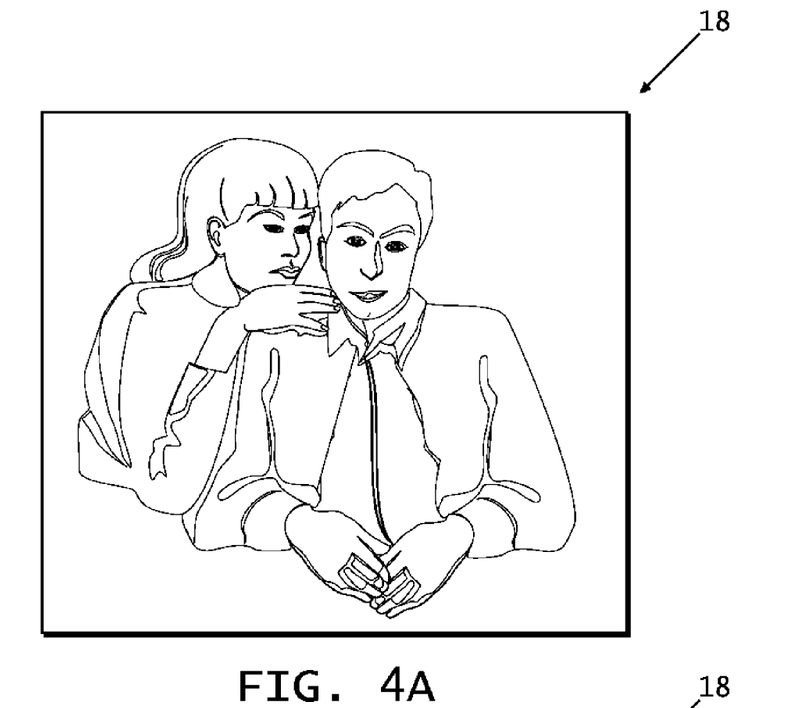
FIGS. 4A to 4G illustrates a photograph as depicted in FIG. 1 with different markings, in accordance with various embodiments of the present invention.

FIG. 4A illustrates one of the photographs 18 of FIG. 1, in accordance with various embodiments of the present invention. The photograph 18 may include embedded data, similar to the index sheet 14 previously described. The photograph 18 may be a full-sized photograph such as a 4×6 photo, or dimensioned photos.

Figure 4B:
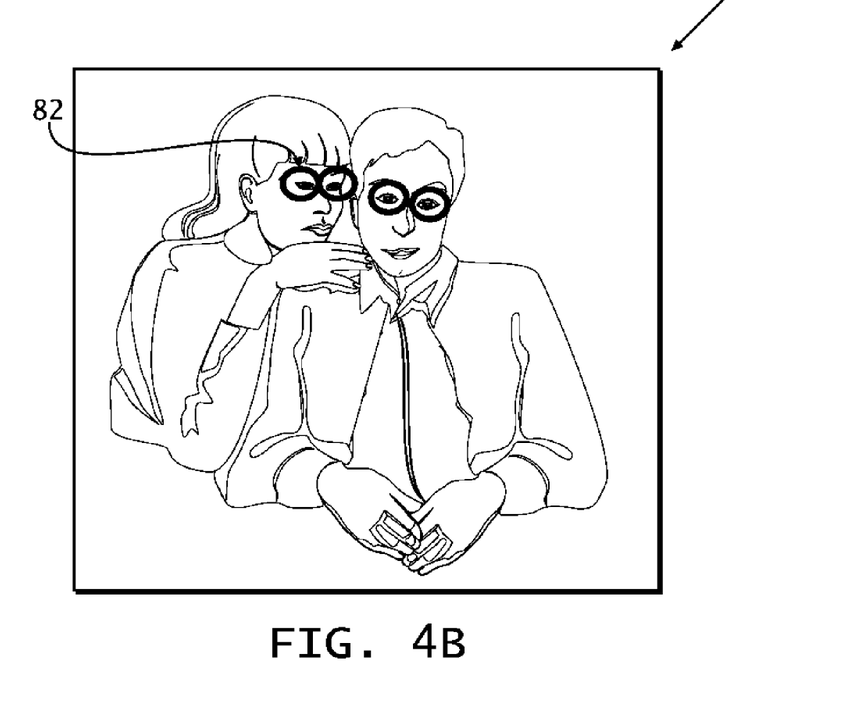

To remove "red-eye" from an image, which is typically an undesirable blemish on a photograph in which some or all of the eyes in a photograph appear red, a user may mark the photograph using the scan sensor 12 to draw circles 82 around the red-eyes as illustrated in FIG. 4B. In some alternative embodiments, a dot may be placed at the red-eye area instead. The printer 10 may track the movement or motion of the scan device 12 as the scan device 12 is being used to draw the circles 82 using the techniques described previously. In particular, the movement of the scan device 12 may be determined based on the determined locations of the scan device 12 with respect to the photograph 18 during an interval of time. Based on the tracking of the scan device 12, the printer 10 may be facilitated in removing red-eyes.

In particular, drawing a circle around a red-eye area may be used as an aid to red-eye removal algorithms. Red-eye removal is typically a very difficult problem. Existing products that can perform fully automatic red-eye removal have a difficult time getting all of the red-eyes removed in a photograph and they may sometime cause certain undesirable results to occur such as turning black. In order to aid the removal of red-eyes, many of these products typically require a user assisted red-eye removal algorithm where the user "points" to the red-eyes that need to be corrected. However, this requires the use of a large display such as those found on personal computers and typically not found on printers. By employing the techniques described previously, removal of red-eyes may be simplified.

Figure 4C:
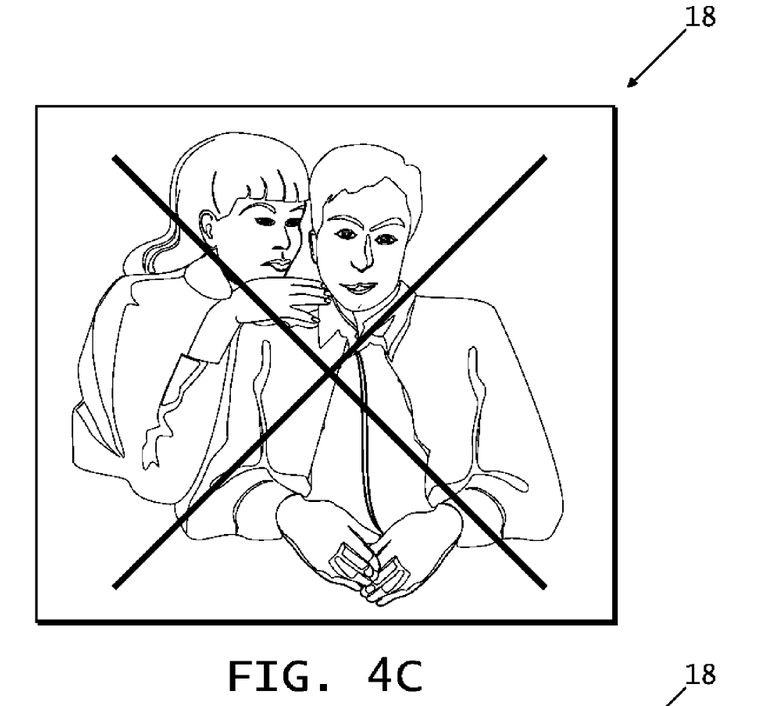
Figure 4D:
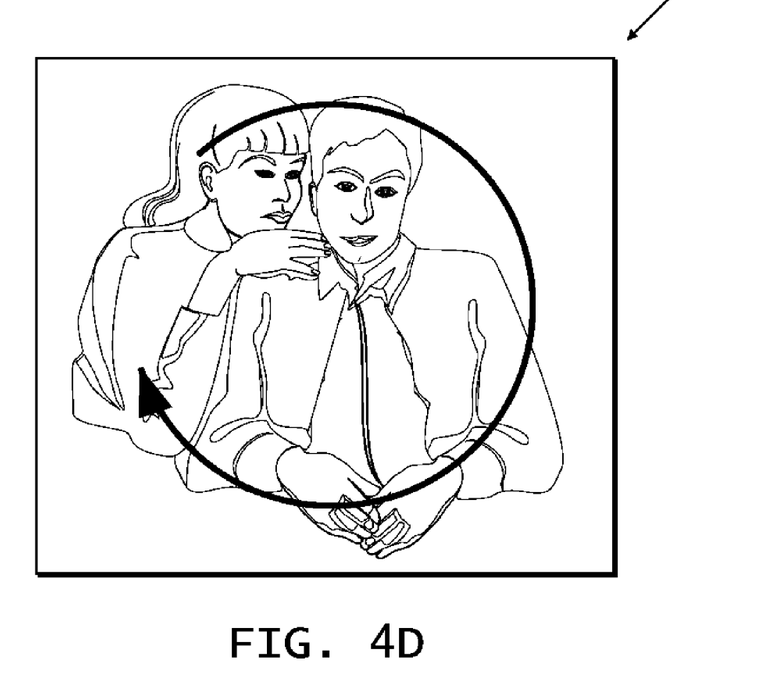

In some embodiments, an image may be deleted from the printer 10 and/or from a device that the image originated from, such as a camera, by using the scan device 12 and simply drawing, for example an "X" on the corresponding photograph 18 as illustrated in FIG. 4C. In some embodiments, an image may be rotated by using the scan device 10 and drawing an arrow on the corresponding photograph 18 as illustrated in FIG. 4D. For example, an image may be rotated so that it is shifted from a landscape view to a portrait view?

Figure 4E:
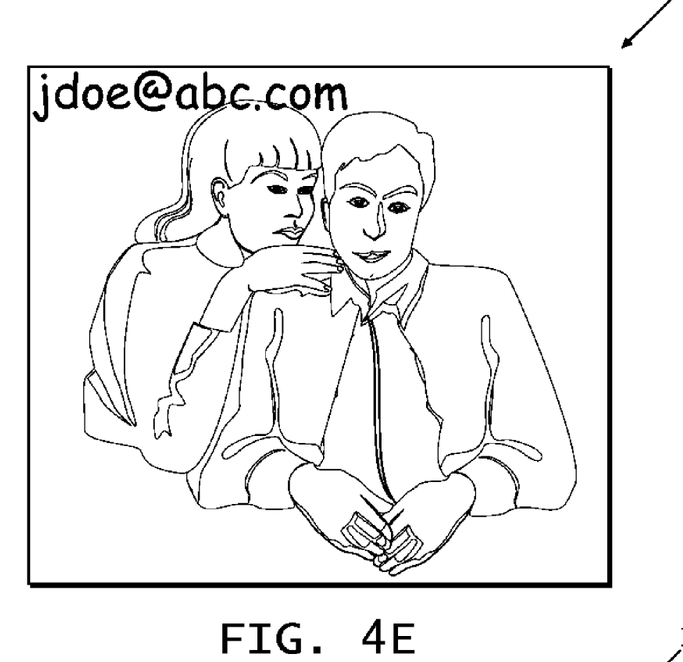
Figure 4F:
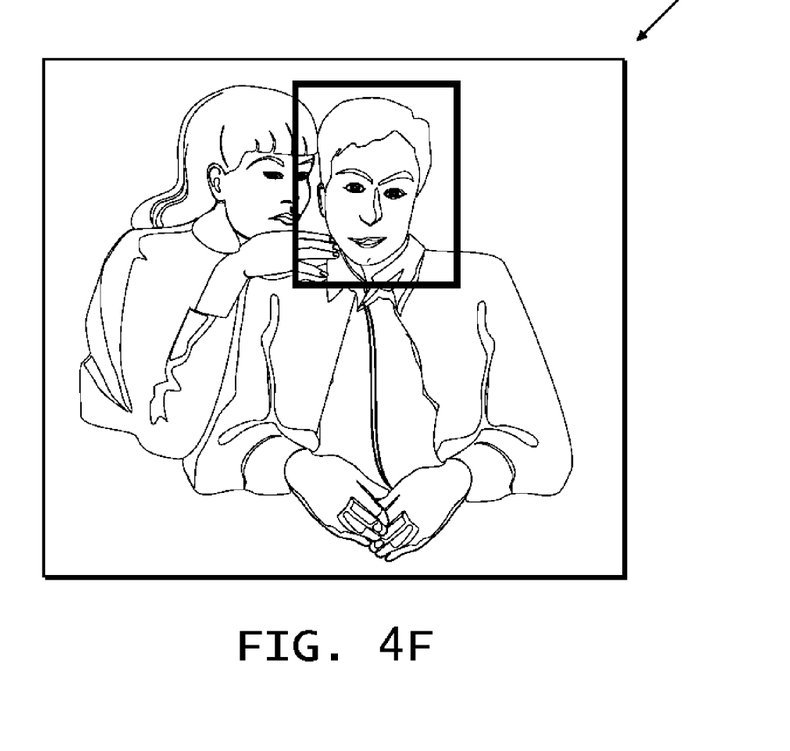
Figure 4G:
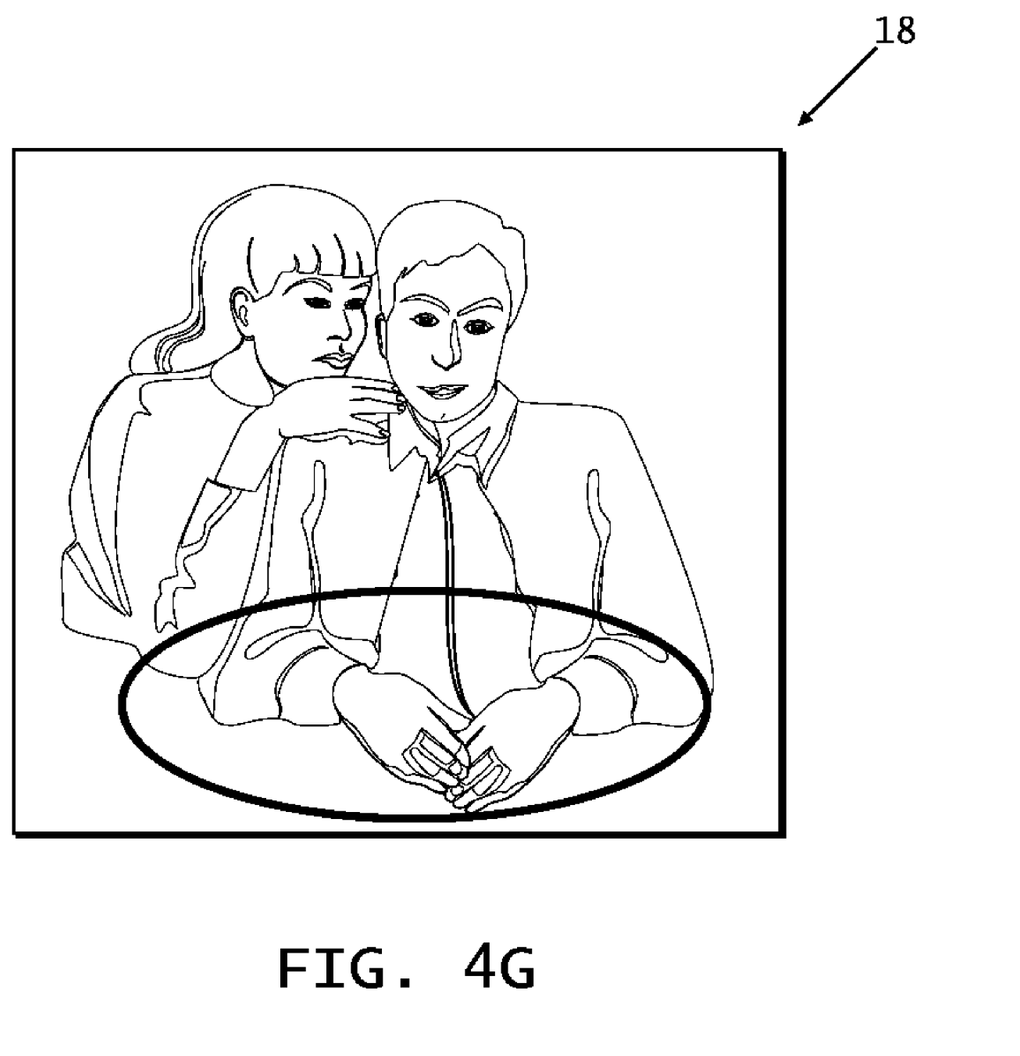

In some embodiments, an image may be marked for saving into an archive or for transmission via email attachment by the user using the scan device 20 to draw a particular symbol on the photograph 18 associated with the image such as drawing a particular kind of arrow and/or writing the name or email address of the email destination as illustrated in FIG. 4E. The image may also be marked for other actions such as printing of the image by drawing another symbol such as a "P" on the corresponding photograph 18. In some embodiments, a portion of an image may be cropped by using the scan device 12 to draw, for example, a box around the portion to be cropped on the corresponding photograph 18 as illustrated in FIG. 4F. In some embodiments, certain portions of an image may be contrast adjusted or enhanced by using the scan device 12 to draw, for example, a circle around the area of interest on the corresponding photograph 18 as illustrated in FIG. 4G in order to select or highlight the area of interest.

By employing the scan device 12, the printer 10 may track the locations of the scan device 12, as well as its relative motion or movement during an interval of time, as the scan device 12 is being used to draw the various symbols and figures on a photograph 18 (as well as on pictures 16 of an index sheet 14). These movements or motions may be interpreted by the printer 10 to determine which actions or operations are to be executed. Again, although in the above, the markings were done on a photograph 18 that is associated with the targeted image, alternatively, marks may also be made on a corresponding picture 16 of the index sheet 14.

Although specific embodiments have been illustrated and described herein, it will be appreciated by those of ordinary skill in the art and others, that a wide variety of alternate and/or equivalent implementations may be substituted for the specific embodiments illustrated and described without departing from the scope of the present invention. This application is intended to cover any adaptations or variations of the embodiments discussed herein. Therefore, it is manifested and intended that various embodiments of the invention be limited only by the claims and the equivalents thereof.

What is claimed is:

1. A method, comprising:
storing one or more images in a printer;
printing, via the printer, a first sheet containing one or more photographic pictures corresponding to the one or more images stored in the printer, wherein the first sheet further includes data embedded into the first sheet;
tracking one or more locations of a scan device with respect to the first sheet, wherein said tracking of the one or more locations of the scan device is based, at least in part, on the data embedded into the first sheet;
selecting one or more of the one or more photographic pictures based on the tracked one or more locations of the scan device with respect to the first sheet; and
executing at least one operation in connection with each image corresponding to the selected one or more photographic pictures,
wherein said executing at least one operation comprises printing, via the printer, a second sheet containing only the selected one or more photographic pictures.

2. The method of claim 1, wherein the one or more locations of the scan device correspond to a motion associated with a print operation.

3. The method of claim 1, wherein said tracking comprises tracking relative movement of the scan device with respect to the first sheet by determining multiple locations of the scan device with respect to the first sheet over an interval of time, and said executing is based, at least in part, on the movement of the scan device with respect to the first sheet.

4. The method of claim 1, wherein said executing at least one operation further comprises modifying, via the scan device, the selected one or more photographic pictures.

5. The method of claim 4, wherein said modifying the selected one or more photographic pictures comprises removing red-eye from the selected one or more photographic pictures.

6. The method of claim 4, wherein said modifying the selected one or more photographic pictures comprises cropping one or more portion(s) of the selected one or more photographic pictures.

7. The method of claim 4, wherein said modifying the selected one or more photographic pictures comprises adjusting contrast or enhancement of one or more portion(s) of the selected one or more photographic pictures.

8. The method of claim 4, wherein said modifying the selected one or more photographic pictures comprises enlarging at least portion(s) of the selected one or more photographic pictures, and said printing the second sheet comprises printing the at least portion(s) of the selected one or more photographic pictures that were enlarged.

9. The method of claim 1, wherein said tracking comprises tracking one or more locations of a nib of the scan device with respect to one or more locations on the first sheet.

10. The method of claim 1, wherein said tracking comprises tracking wirelessly the one or more locations of the scan device.

11. The method of claim 1, wherein said scan device generates electronic data based on scanning one or more selective portions of the first sheet and reading the data embedded into the first sheet in the one or more selective portions, and said tracking comprises determining a particular location of the scan device with respect to the first sheet by processing the generated electronic data.

12. The method of claim 1, wherein said scan device generates electronic data based on scanning one or more selective portions of the first sheet and reading the data embedded into the first sheet in the one or more selective portions of the sheet, and said tracking comprises determining one or more identities of the selected one or more photographic pictures by processing said electronic data.

13. The method of claim 1, further comprising at least one of emailing all or a subset of the selected one or more photographic pictures and/or displaying all or a subset of the selected one or more photographic pictures.

14. The method of claim 1, wherein said printing the first sheet comprises printing the first sheet with a pattern of dots and data embedded to indicate locations of the dots with respect to the first sheet.

15. The method of claim 1, wherein said printing the first sheet comprises printing the first sheet with photograph identities associated with the one or more photographic pictures.

16. A method, comprising:
  scanning, by a scan device, one or more selective portions of a sheet having first one or more photographic pictures while not scanning other portions of the sheet, said scanning including reading embedded data in the one or more selective portions of the sheet; and said first one or more photographic pictures being associated with one or more corresponding images;
  generating electronic data based on the embedded data, said electronic data indicating, at least in part, one or more relative positions of the scan device with respect to the sheet; and
  transmitting the electronic data to a printer to facilitate the printer in executing at least one operation in connection with all or a selected subset of the corresponding images.

17. The method of claim 16, wherein the one or more relative positions of the scan device correspond to a motion associated with a print operation.

18. The method of claim 16, wherein said scanning comprises scanning multiple selective portions of the sheet over an interval of time and reading embedded data in the multiple selective portions, and generating and transmitting to the printer electronic data indicating the one or more relative positions of the scan device relative to the sheet during the interval of time to facilitate the printer in determining relative movement of the scan device with respect to the sheet.

19. The method of claim 16, wherein said electronic data is transmitted wirelessly to the printer.

20. The method of claim 16, wherein the sheet includes a pattern of dots and data to indicate locations of the dots with respect to the sheet, and said reading includes reading at least one dot and data that indicates the location of the at least one dot with respect to the sheet.

21. The method of claim 16, wherein the sheet includes photograph identities associated with the one or more corresponding images, and said reading includes reading at least one photograph identity.

22. A system, comprising:
  a scan device configured to scan one or more selective portions of a sheet having first one or more photographic pictures while not scanning other portions of the sheet, to read embedded data in the one or more selective portions of the sheet and to generate and transmit electronic data based on the embedded data, said first one or more photographic pictures associated with one or more corresponding images; and
  a printer communicatively coupled to the scan device to receive the electronic data and to track one or more locations of the scan device with respect to the sheet based on the electronic data, and to execute at least one operation in connection with all or a selected subset of the corresponding images based, at least in part, on the tracking.

23. The system of claim 22, wherein the one or more locations of the scan device correspond to a motion associated with a print operation.

24. The system of claim 22, wherein said printer is configured to perform said at least one operation by printing a second one or more photographic pictures on one or more sheets based, at least in part, on the electronic data received from the scan device.

25. The system of claim 22, wherein said printer is further configured to print the sheet with the first one or more photographic pictures, and to print the embedded data onto the sheet.

26. The system of claim 22, wherein said scan device includes an interface to wirelessly transmit the electronic data to the printer.

27. The system of claim 26, wherein said printer includes another interface to wirelessly receive the electronic data from the scan device.

* * * * *